United States Patent [19]

Choe

[11] Patent Number: 4,755,574

[45] Date of Patent: Jul. 5, 1988

[54] ACRYLIC POLYMERS EXHIBITING CHIRAL AND NONLINEAR OPTICAL PROPERTIES

[75] Inventor: Eui W. Choe, Randolph, N.J.

[73] Assignee: Hoechst Celanese Corporation, Somerville, N.J.

[21] Appl. No.: 915,181

[22] Filed: Oct. 3, 1986

[51] Int. Cl.⁴ ............................................. C08F 26/06
[52] U.S. Cl. ................................ 526/258; 252/299.1; 526/265
[58] Field of Search .......................... 526/258, 265, 263

[56] References Cited

U.S. PATENT DOCUMENTS 4,452,878 6/1984 Locatell, Jr. .......................... 430/215
4,631,328 12/1986 Ringsdorf ............................. 526/259

*Primary Examiner*—Christopher Henderson
*Attorney, Agent, or Firm*—Depaoli & O'Brien

[57] ABSTRACT

In one embodiment this invention provides a nonlinear optical medium which is a transparent film of a thermoplastic polymer composed of recurring monomeric units corresponding to the formula:

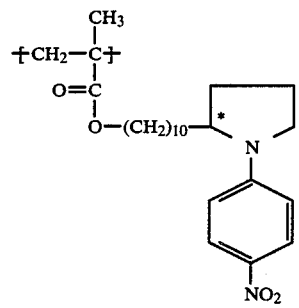

18 Claims, No Drawings

ACRYLIC POLYMERS EXHIBITING CHIRAL AND NONLINEAR OPTICAL PROPERTIES

This invention was made with Government support under Contract Number F49620-85-0047 awarded by the Department of Defense. The Federal Government has certain rights in this invention.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

There is continuing research effort to develop new nonlinear optical organic systems for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide organic compositions which are characterized by a delocalized conjugated $\pi$-electron system which can exhibit nonlinear optical response.

It is another object of this invention to provide novel thermoplastic polymers which are characterized by recurring pendant chiral ester structures which exhibit nonlinear optical response.

It is a further object of this invention to provide high performance nonlinear optical media and devices.

Other objects and advantages of the present invention shall become apparent from the accompanying description and examples.

DESCRIPTION OF THE INVENTION

One or more objects of the present invention are accomplished by the provision of a thermoplastic polymer which is characterized by a recurring monomeric unit corresponding to the formula:

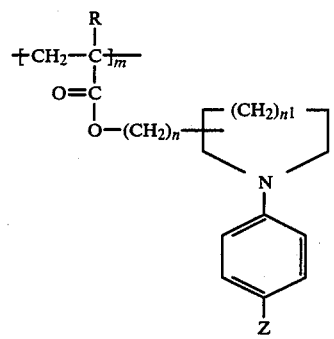

where R is a substituent selected from hydrogen and $C_1$–$C_4$ alkyl groups; m is an integer of at least 3; n is an integer of about 1–25; $n^1$ is 0 or 1; Z is —$NO_2$, —CN or —$CF_3$; and wherein the pendant ester group exhibits chiral optical properties and nonlinear optical response.

Illustrative of the R substituent in the above formula are $C_1$–$C_4$ alkyl groups such as methyl, ethyl, propyl, isopropyl, butyl, isobutyl and 2-butyl.

The weight average molecular weight of the thermoplastic polymer can vary in the range between about 500–500,000, and typically will be in the range between about 5000–200,000.

In the monomer formula represented above, the cyclic imine structure in the pendant ester group contains an asymmetric carbon atom (C*). Because of the presence of the asymmetric carbon atom, the structural unit in the formula, and the corresponding acrylate monomer before polymerization, exhibit chiral optical properties.

The term "chiral" as employed herein refers to optical enantiomeric structures which are characterized by the ability to rotate plane polarized light as observed in a polarimeter. The term "chiral" is defined on pages 123–124 in "The Vocabulary Of Organic Chemistry"; John Wiley Sons; New York; 1980.

A thermoplastic polymer of the present invention can contain polymerized comonomeric units in addition to the recurring acrylate monomeric unit represented in the formula above. It is preferred that the recurring acrylate monomeric units of the formula comprise at least about 20 weight percent of the total polymer weight.

Suitable comonomeric units include polymerized divalent residues of ethylene; vinyl halides such as vinyl chloride, vinylidene chloride and vinyl fluoride; arylethylenes such as styrene, vinylnaphthalene and vinylcarbazole; acrylamides such as acrylamide, methacrylamide, N,N-dialkylacrylamide and N,N-dialkylmethacrylamide; acrylonitriles such as acrylonitrile or methacrylonitrile; acrylates such as alkyl acrylate, alkyl methacrylate and alkyl alpha-phenylacrylate; liquid crystalline acrylates and methacrylates;and the like.

In another embodiment this invention provides a transparent nonlinear optical medium comprising a thermoplastic polymer which is characterized by a recurring monomeric unit corresponding to the formula:

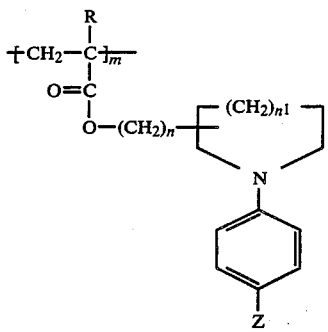

where R is a substituent selected from hydrogen and $C_1$–$C_4$ alkyl groups; m is an integer of at least 3; n is an integer of about 1–25; $n^1$ is 0 or 1; Z is —$NO_2$, —CN or —$CF_3$; and wherein the pendant ester group exhibits chiral optical properties and nonlinear optical response.

A present invention transparent nonlinear optical medium can be prepared by dissolving the thermoplastic polymer in a solvent such as toluene or N,N-dimethylformamide and spraying or dipping the solution on the surface of a transparent substrate such as optical glass to form a thin coating. A nonlinear optical medium also can be shaped by casting or molding a melt phase of the thermoplastic polymer to form a film, lens, prism, and the like.

Another method of preparing a nonlinear optical medium is to spray or cast a polymerizable acrylate monomer corresponding to the formula above, and then polymerize the shaped monomer medium by appropriate heat or irradiation conditions.

Because of the unique combination of chiral cyclic imine and charge asymmetric conjugated unsaturation in the pendant ester group of a present invention monomer or polymer, there is an inherent steric molecular orientation which contributes some degree of noncentrosymmetry to a macroscopic domain of the molecules.

Pertinent publications in connection with chirality and hydrogen bonding in molecular crystals for phase-matched second harmonic generation include J. Chem. Phys., 81(9), November 1984 by J. Zyss et al; and J. Mol. Electron., 1, 25 (1985) by J. Zyss.

As proposed in these articles the simultaneous chiral and hydrogen-bonding characteristic of the electron-donating group in N-(4-nitrophenyl)-(L)-prolinol(NPP) leads to a quasioptimal angle in a molecular crystal with respect to quadratic phase-matched nonlinear interactions, between the molecular transition dipole moments and the twofold axis of the monoclinic $P2_1$ crystal structure. Based on a simple oriented gas description of the quasiplanar structure of the crystal, two possible mutually exclusive second harmonic phase-matched configurations are apparent and shown to promote the optimized nonlinear tensor coefficient.

In another embodiment this invention provides a light switch or light modulator device with a polymeric nonlinear optical component comprising a transparent solid medium of a polymer which is characterized by a recurring monomeric unit corresponding to the formula:

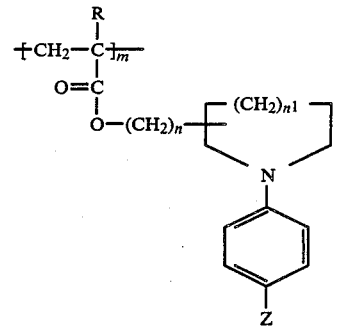

where R is a substituent selected from hydrogen and $C_1$–$C_4$ alkyl groups; m is an integer of at least 3; n is an integer of about 1–25; $n^1$ is 0 or 1; Z is —$NO_2$, —CN or —$CF_3$; and wherein the pendant ester group exhibits chiral optical properties and nonlinear optical response.

In a further embodiment this invention provides a polymerizable composition corresponding to the formula:

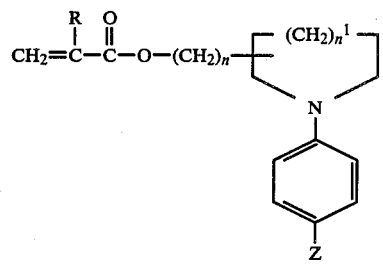

where R is a substituent selected from hydrogen and $C_1$–$C_4$ alkyl groups; n is an integer of about 1–25; $n^1$ is 0 or 1; Z is —$NO_2$, —CN or —$CF_3$; and wherein the pendant ester group exhibits chiral optical properties and nonlinear optical response.

The term "transparent" as employed herein refers to a liquid or solid medium which is transparent or light transmitting with respect to incident fundamental light frequencies and harmonic light frequencies.

The term "charge asymmetric" as employed herein refers to the dipolarity characteristic of organic molecules containing an electron-withdrawing group which is in conjugation with an electron-donating group.

A nonlinear optical medium as defined above typically is in the form of a noncentrosymmetric configuration of aligned polymer molecules, and the medium can exhibit a Miller's delta of at least about one square meter/coulomb. As described hereinafter, noncentrosymmetric alignment of molecules can be induced with an external field. If polymer molecules in a medium are in a random configuration, the medium exhibits third order optical susceptibility $\chi^{(3)}$ harmonic response.

The term "Miller's delta" as employed herein with respect to second harmonic generation (SHG) is defined by Garito et al in Chapter 1, "Molecular Optics:Nonlinear Optical Properties Of Organic And Polymeric Crystals"; ACS Symposium Series 233 (1983).

The quantity "delta" ($\delta$) is defined by the equation:

$$d_{ijk} = \epsilon_0 \chi_{ii}^{(1)} \chi_{jj}^{(1)} \chi_{kk}^{(1)} \delta_{ijk}$$

where terms such as $\chi_{ii}^{(1)}$ are the linear susceptibility components, and $d_{ijk}$, the second harmonic coefficient, is defined through $$\chi_{ijk}(-2\omega; \omega,\omega) = 2d_{ijk}(-2\omega; \omega,\omega)$$

The Miller's delta ($10^{-2}$ m²/c at 1.06 μm) of various nonlinear optical crystalline substrates are illustrated by KDP (3.5), LiNbO$_3$ (7.5), GaAs (1.8) and 2-methyl-4-nitroaniline (160).

Preparation of Acrylic-Polymers

The following reaction diagram illustrates a general method of synthesizing a present invention thermoplastic acrylic polymer;

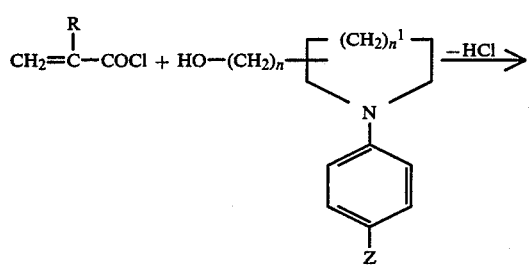

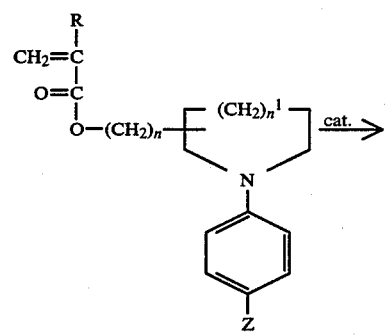

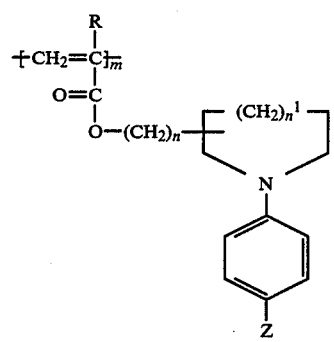

Another synthesis method is illustrated by the following reaction diagram:

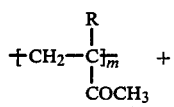

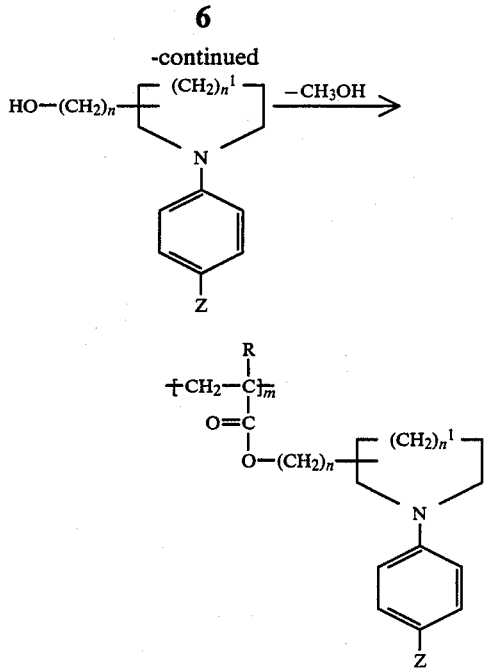

Nonlinear Optical Properties

The fundamental concepts of nonlinear optics and their relationship to chemical structures can be expressed in terms of dipolar approximation with respect to the polarization induced in an atom or molecule by an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are non-vanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a polymer domain:

$$\Delta\mu = \mu_e - \mu_g = \alpha E + \beta EE + \gamma EEE + \quad (1)$$

$$P = P_O + \chi^{(1)}E + \chi^{(2)}EE + \chi^{(3)}EEE + \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and harmonic wave.

A present invention thermoplastic acrylic polymer medium typically is optically transparent and exhibits hyperpolarization tensor properties such as second harmonic generation.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

External Field-induced Macroscopic Optical Nonlinearity

The term "external field" as employed herein refers to an electric, magnetic or mechanical stress field which is applied to a substrate of mobile organic molecules, to induce dipolar alignment of the molecules parallel to the field.

The electronic origins of nonlinear optical effects in organic $\pi$-electronic systems is reviewed by D. J. Williams in Angew. Chem., Int. Ed. Engl., 23, 690 (1984); incorporated herein by reference.

As described in the review article, a technique has been developed for measuring $\beta$ without necessitating the incorporation of the molecule into noncentrosymmetric crystal structures. In this technique, called electric-field induced second-harmonic generation (EFISH), a strong DC electric field is applied to a liquid or a solution of the molecules of interest in order to remove the orientational averaging by statistical alignment of molecular dipoles in the medium. The induced second-order nonlinearity can then produce a signal at $2\omega$, from which $\beta$ can be extracted.

A schematic diagram of experimental system for measurement of $\beta$ by the EFISH technique is presented in the review article. As illustrated in the published diagram, the 1.06 $\mu$m output of a $Nd^{3+}$:YAG laser is split and directed into a sample and a reference cell. The sample cell is translated by a stepped-motor-controlled stage across the beam. The laser pulse is synchronized with a high-voltage DC pulse to induce harmonic generation in the cell. The 0.53 $\mu$m radiation is separated from the 1.06 $\mu$m pump beam by filters and a monochromator, and the harmonic intensity is detected by a photomultiplier tube. The signal-to-noise ratio can be improved with a boxcar averager. The reference beam is directed into a crystal such as quartz, whose second-order properties are well known, so that fluctuations in beam intensity can be readily corrected in the output data. The value of the nonlinear coefficient is obtained from the ratio of the signals of the sample cell and a reference material such as quartz or $LiNbO_3$ with known $\chi^{(2)}$.

A present invention thermoplastic acrylic polymer is adapted to exhibit the external field-induced macroscopic nonlinearity required for second order harmonic generation.

The following examples are further illustrative of the present invention. The components and specific ingredients are presented as being typical, and various modifications can be derived in view of the foregoing disclosure within the scope of the invention.

EXAMPLE I

This Example illustrates the preparation of a thermoplastic polymer exhibiting chiral and nonlinear optical properties in accordance with the present invention.

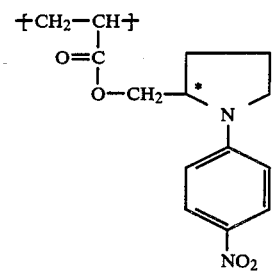

A 300 ml three-necked reactor equipped with a mechanical stirrer, an addition funnel, and nitrogen inlet and outlet, is charged with 2.5 grams of polyacryloyl chloride in dioxane. A dimethylacetamide solution (60 ml) containing 6.13 grams (27.6 mmoles) of L-N-p-nitrophenyl-2-pyrrolidinemethanol is added to the reactor. The resulting reaction mixture is stirred at 25° C. for 72 hours, and heated at 70° C. for 16 hours, and then poured into water to precipitate the polymer. The solid precipitate is filtered, washed with water, and toluene, and then dried at 100° C. for 16 hours at 0.1 Torr to provide poly(L-N-p-nitrophenyl-2-pyrrolidinemethyl acrylate) product. The polymer has a weight average molecular weight of about 25,000–30,000.

The polymer is dissolved in dimethylacetamide and sprayed on the surface of optical glass to form a transparent coating. The coating exhibits a second order nonlinear optical susceptibility $\chi^{(2)}$ of about $1 \times 10^{-9}$ esu measured at 1.91 $\mu$m excitation wavelength.

Employing a similar procedure, polymers are prepared by polymerizing L-N-p-nitrophenyl-2-pyrrolidinemethyl acrylate, L-N-p-cyanophenyl-2-pyrrolidinemethyl acrylate and L-N-p-trifluoromethylphenyl-2-pyrrolidinemethyl acrylate, respectively.

The monomers are prepared by reacting acryloyl chloride with L-N-p-nitrophenyl-2-pyrrolidinemethanol, L-N-p-cyanophenyl-2-pyrrolidinemethanol and L-N-p-trifluoromethylphenyl-2-pyrrolidinemethanol, respectively.

The corresponding methacrylate monomers and polymers are prepared using the same procedures described above.

Corresponding monomers and polymers with a chiral piperidine structure instead of a pyrrolidine structure are prepared using the same procedures described above.

EXAMPLE II

This Example illustrates the preparation of a thin substrate of thermoplastic polymer with a macroscopic noncentrosymmetric molecular orientation in accordance with the present invention.

Poly(L-N-p-nitrophenyl-2-pyrrolidinemethyl acrylate) polymer as described in Example I is compression molded to form a film of about 500 micron thickness.

The molding is accomplished in a 30 ton press (Wabash Metal Products, Inc. Model #30-1010-2TMX) with programmed heating and cooling, and adjustable pressure. The platen temperature is set at 150° C. The polymer in particulate form is placed between two Kapton (DuPont polyimide) sheets and positioned between the two platens. The platens are closed and 6 tons pressure is applied for 2 minutes. The platens are then cooled to 50° C. within thirty seconds, the pressure is released, and the film sample is retrieved from the press.

X-ray diffraction patterns from this film sample, recorded by using nickel filtered CuK$_\alpha$ radiation and flat plate photographic techniques, indicate a partial orientation of polymer molecular axes.

Additional molecular alignment of the polymer molecule axes is achieved in the following manner. The film sample is sandwiched between two Kapton films of 0.002 inch thickness which in turn are sandwiched between two metal plates of 0.25 inch thickness, each having a ground flat surface and a rod attached to one side which serves as a contact for application of voltage in the alignment procedure. The sub-assembly is covered on top and bottom with a double layer of Kapton sheets of 0.002 inch thickness and providing a 0.004 inch electrical insulating layer against each platen.

The whole assembly is placed between the platens of the press previously employed for preparing the unoriented precursor film sample. The platens are preheated to 150° C., then closed and a pressure of 6 tons is applied. Wires from a DC power supply are attached to the rods of the electrode plates and a voltage of 700 V is applied for two hours while maintaining temperature and pressure.

The press is cooled rapidly to 50° C. while pressure and voltage are maintained. At that temperature, the voltage is reduced to zero and the pressure released. The molecularly aligned film sample is retrieved from the mold, and X-ray diffraction patterns are recorded with nickel filtered CuK$_\alpha$ radiation and wide-angle photographic flat plate techniques. Orientation functions are determined utilizing a polar table and a microdensitometer interfaced with a LeCray computer.

The data demonstrate that the molecular alignment process results in a rotation of essentially all of the molecular axes of the polymer molecules into a direction parallel to that of the external field. This type of molecularly aligned polymer film is noncentrosymmetric and can function as a second-order harmonic-generating nonlinear optical medium for a high intensity light field to which the medium is optically clear, e.g., as the nonlinear optical component in a light switch or light modulator device, with a Miller's delta of at least about one square meter/coulomb.

What is claimed is:

1. A thermoplastic polymer which is characterized by a recurring monomeric unit corresponding to the formula:

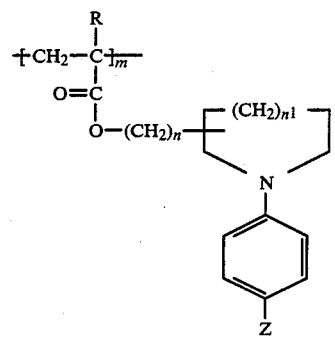

where R is a substituent selected from hydrogen and C$_1$-C$_4$ alkyl groups; m is an integer of at least 3; n is an integer of about 1-25; n$^1$ is 0 or 1; Z is —NO$_2$, —CN or —CF$_3$; and wherein the pendant ester group exhibits chiral optical properties and nonlinear optical response.

2. A thermoplastic polymer in accordance with claim 1 wherein R is hydrogen.

3. A thermoplastic polymer in accordance with claim 1 wherein R is methyl.

4. A thermoplastic polymer in accordance with claim 1 wherein Z is —NO$_2$.

5. A thermoplastic polymer in accordance with claim 1 wherein Z is —CN.

6. A thermoplastic polymer in accordance with claim 1 wherein Z is —CF$_3$.

7. A thermoplastic polymer in accordance with claim 1 wherein the cyclic imine structure contains an asymmetric carbon atom.

8. A thermoplastic polymer in accordance with claim 1 wherein the polymer has a weight average molecular weight between about 500–500,000.

9. A thermoplastic polymer in accordance with claim 1 wherein the recurring monomeric units comprise at least about 20 weight percent of the total polymer weight.

10. A thermoplastic polymer in accordance with claim 1 wherein the polymer additionally is characterized by recurring polymerized ethylene monomeric units.

11. A thermoplastic polymer in accordance with claim 1 wherein the polymer additionally is characterized by recurring polymerized vinyl halide monomeric units.

12. A thermoplastic polymer in accordance with claim 1 wherein the polymer additionally is characterized by recurring polymerized arylethylene monomeric units.

13. A thermoplastic polymer in accordance with claim 1 wherein the polymer additionally is characterized by recurring polymerized acrylamide, methacrylamide, N,N-dialkylacrylamide or N,N-dialkylmethacrylamide monomeric units.

14. A thermoplastic polymer in accordance with claim 1 wherein the polymer additionally is characterized by recurring polymerized acrylonitrile or methacrylonitrile monomeric units.

15. Poly(L-N-p-nitrophenyl-2-pyrrolidinemethyl acrylate).

16. Poly(L-N-p-nitrophenyl-2-pyrrolidinemethyl methacrylate).

17. Poly(L-N-p-cyanophenyl-2-pyrrolidinemethyl acrylate).

18. Poly(L-N-p-cyanophenyl-2-pyrrolidinemethyl methacrylate).

* * * * *